United States Patent
Du et al.

(10) Patent No.: US 12,550,302 B2
(45) Date of Patent: Feb. 10, 2026

(54) DISPLAY MODULE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Ajuan Du, Beijing (CN); Liang Gao, Beijing (CN); Bin Wang, Beijing (CN); Yang Wang, Beijing (CN); Yongle Wang, Beijing (CN); Hao Sun, Beijing (CN); Enjian Yang, Beijing (CN); Feifan Li, Beijing (CN); Hufei Yang, Beijing (CN); Xiaoxia Huang, Beijing (CN); Yilun Zeng, Beijing (CN); Yiqian Wu, Beijing (CN); Guodong Zeng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 238 days.

(21) Appl. No.: 18/267,647

(22) PCT Filed: Aug. 23, 2022

(86) PCT No.: PCT/CN2022/114334
§ 371 (c)(1),
(2) Date: Jun. 15, 2023

(87) PCT Pub. No.: WO2023/040607
PCT Pub. Date: Mar. 23, 2023

(65) Prior Publication Data
US 2024/0064945 A1  Feb. 22, 2024

(30) Foreign Application Priority Data
Sep. 14, 2021  (CN) .......................... 202122225583.6

(51) Int. Cl.
*H05K 7/20* (2006.01)
*H05K 9/00* (2006.01)

(52) U.S. Cl.
CPC ....... *H05K 7/20963* (2013.01); *H05K 9/0054* (2013.01)

(58) Field of Classification Search
None
See application file for complete search history.

(56) References Cited

U.S. PATENT DOCUMENTS

2020/0192431 A1*  6/2020  Shin ...................... G06F 1/1626
2020/0196496 A1   6/2020  Shin
(Continued)

FOREIGN PATENT DOCUMENTS

| CN | 112365798 A | 2/2021 |
| CN | 112909069 A | 6/2021 |

(Continued)

OTHER PUBLICATIONS

KR-20210081953-A English translation (Year: 2021).*
JP 2021122401 A (Year: 2021).*

*Primary Examiner* — Mukundbhai G Patel
(74) *Attorney, Agent, or Firm* — WHDA, LLP (57) ABSTRACT

A displaying module includes a transparent cover plate, a display panel and a heat dissipating film layer; the transparent cover plate covers a first surface of the display panel, an area of the display panel is less than an area of the transparent cover plate, and the first surface refers to a surface of the display panel where a light ray exits; and the heat dissipating film layer covers a second surface of the display panel, and at least part of an edge position of the heat dissipating film layer contacts an inner surface of the transparent cover plate, wherein the second surface refers to a surface of the display panel that is opposite to the first surface, the inner surface of the transparent cover plate (Continued)

refers to a surface of the transparent cover plate that contacts the display panel, and the heat dissipating film layer is electrically conductive.

19 Claims, 5 Drawing Sheets

(56) References Cited

U.S. PATENT DOCUMENTS

2021/0343992 A1\* 11/2021 Gong ................ H10K 59/8794
2022/0310979 A1   9/2022 Li et al.

FOREIGN PATENT DOCUMENTS

| CN | 113178134 A | | 7/2021 | |
|---|---|---|---|---|
| CN | 216698367 U | | 6/2022 | |
| JP | 2021122401 A | \* | 8/2021 | |
| KR | 20210081953 A | \* | 7/2021 | ............. G09F 9/301 |

\* cited by examiner

DISPLAY MODULE AND DISPLAY DEVICE

The present disclosure claims the priority of the Chinese patent application filed on Sep. 14, 2021 before the China National Intellectual Property Administration with the application number of 202122225583.6 and the title of "DISPLAY MODULE AND DISPLAY DEVICE", which is incorporated herein in its entirety by reference.

TECHNICAL FIELD

The present disclosure relates to the technical field of electronic devices, and particularly relates to a displaying module and a displaying device.

BACKGROUND

In the related art, in order to facilitate the heat conduction of Organic Electroluminescence Display (OLED) displaying modules, usually a heat dissipating film layer is provided at the shadow surface of the displaying module.

Currently, the heat dissipating film layer is usually of a retracted rectangular plate structure, and is closely adhered to the non-displaying surface of the display panel of the displaying module, and a transparent cover plate covers the displaying surface of the display panel, whereby the display panel is located between the transparent cover plate and the heat dissipating film layer.

However, in a copper-rod test, the friction between the copper rods generates static electricity, and the induced electric charges are directed from the lateral sides of the transparent cover plate to the non-displaying surface of the display panel. Because there is no conduction path between the heat dissipating film layer and the display panel for the electric charges to dissipate, the electrostatic-charge induction exists for a long time and the accumulation of the electric charges is caused. When they are accumulated to a certain extent, the electric field is excessively large, which causes an electron beam of the thin-film transistor (TFT) at the interface between the display panel and the heat dissipating film layer, thereby causing TFT positive skewness, to result in green conversion at the edge region of the displaying module, to affect the quality of the displaying module and the usage experience of the user.

SUMMARY

An embodiment of the present disclosure provides a displaying module and a displaying device, to solve the problem in the related art that the transparent cover plate causes green conversion at the edge region of the displaying module due to the friction in a copper-rod test.

In order to solve the above technical problem, the present disclosure is realized as follows.

In the first aspect, an embodiment of the present disclosure provides a displaying module, where the displaying module includes a transparent cover plate, a display panel and a heat dissipating film layer;

the transparent cover plate covers a first surface of the display panel, and an area of the display panel is less than an area of the transparent cover plate, where the first surface refers to a surface of the display panel where a light ray exits; and the heat dissipating film layer covers a second surface of the display panel, and at least part of an edge position of the heat dissipating film layer contacts an inner surface of the transparent cover plate, where the second surface refers to a surface of the display panel that is opposite to the first surface, the inner surface of the transparent cover plate refers to a surface of the transparent cover plate that contacts the display panel, and the heat dissipating film layer is electrically conductive.

Optionally, the displaying module further includes a circuit board and a chip packaging layer;

the circuit board is provided on a surface of the heat dissipating film layer; and the chip packaging layer includes an insulating film layer and an electrically conducting film layer, the insulating film layer covers a surface of the circuit board, the electrically conducting film layer covers the insulating film layer, and the electrically conducting film layer includes a copper layer.

Optionally, the heat dissipating film layer includes a center region and a peripheral region;

the peripheral region is located at an edge position of the center region, and a plane where the peripheral region is located and a plane where the center region is located intersect; and the center region covers the second surface of the display panel, and the display panel is located in a cavity formed by the center region, the peripheral region and the transparent cover plate.

Optionally, the peripheral region includes a first region, a second region and a third region; and the display panel includes a first lateral side, a second lateral side and a third lateral side, the first region is located on an outer side of the first lateral side and is bent toward the transparent cover plate, the second region is located on an outer side of the second lateral side and is bent toward the transparent cover plate, and the third region is located on an outer side of the third lateral side and is bent toward the transparent cover plate, where the first lateral side and the second lateral side refer to two parallel longer sides of the display panel, and the third lateral side and the first lateral side are perpendicular.

Optionally, the center region further includes circular-arc regions; and the circular-arc regions are located at four corners of the center region, projections of the circular-arc regions on the display panel in a first direction are of a circular-arc shape, and spacings are provided between a projection of each of the circular-arc regions and edges of a neighboring corner of the display panel, where the first direction refers to a direction perpendicular to the display panel.

Optionally, both of the spacings between the projection of each of the circular-arc regions and the edges of the neighboring corner of the display panel are a first numerical value, where the first numerical value is greater than or equal to 0.1 mm, and less than or equal to 1 mm.

Optionally, extension parts are provided between two ends of the first region and neighboring circular-arc regions, two ends of the second region and neighboring circular-arc regions, and two ends of the third region and neighboring circular-arc regions; and projections of the extension parts in the first direction are on the display panel.

Optionally, a length of the extension part between the two ends of the first region and the neighboring circular-arc regions is a first length, a length of the extension part between the two ends of the second region and the neighboring circular-arc regions is a second length, and a length of the extension part between the two ends of the third region and the neighboring circular-arc regions is a third length; and all of the first length, the second length and the third length are greater than 0, and less than or equal to 10 mm, where the first length and the second length refer to lengths of projections of the extension parts on the display panel in the first direction that are parallel to the first lateral side of the display panel, and the second length refers to a length of a projection of the extension part on the display panel in the first direction that is parallel to the third lateral side of the display panel.

Optionally, a spacing between a projection of the first region on the display panel and the first lateral side of the display panel is a second numerical value, a spacing between a projection of the second region on the display panel and the second lateral side of the display panel is a third numerical value, and a spacing between a projection of the third region on the display panel and the third lateral side of the display panel is a fourth numerical value, where the second numerical value, the third numerical value and the fourth numerical value are greater than or equal to 0.1 mm, and less than or equal to 5 mm.

Optionally, the displaying module further includes a circuit board and a chip packaging layer, the center region further includes a bottom side, and the display panel further includes a fourth lateral side; and the fourth lateral side refers to one side of the display panel that is close to the circuit board or the chip packaging layer, the bottom side refers to one side that is close to the circuit board or the chip packaging layer, and a projection of the bottom side on the display panel is located on one side of the fourth lateral side away from the chip packaging layer.

Optionally, a spacing between the projection of the bottom side on the display panel and the fourth lateral side is a fifth numerical value, where the fifth numerical value is greater than or equal to 0.1 mm, and less than or equal to 1 mm.

Optionally, the heat dissipating film layer includes an insulating layer and an electrically conductive layer;

the insulating layer adheres to the second surface of the display panel, and the electrically conductive layer covers the insulating layer; and in the first region, the second region and the third region, the electrically conductive layer exposes part of the insulating layer.

Optionally, in the first region the insulating layer has at least one first exposed region, in the second region the insulating layer has at least one second exposed region, and in the third region the insulating layer has at least one third exposed region;

in a direction parallel to the first lateral side, a length of the first exposed region is less than or equal to one third of a length of the first lateral side, and in a direction parallel to the third lateral side, the length of the first exposed region is less than or equal to a length of the first region;

in a direction parallel to the second lateral side, a length of the second exposed region is less than or equal to one third of a length of the second lateral side, and in the direction parallel to the third lateral side, the length of the first exposed region is less than or equal to a length of the second region; and in the direction parallel to the third lateral side, a length of the third exposed region is less than or equal to one third of a length of the third lateral side, and in the direction parallel to the first lateral side, the length of the third exposed region is less than or equal to a length of the third region.

In the second aspect, an embodiment of the present disclosure further provides a displaying device, and the displaying device includes the displaying module according to any one of the embodiments in the first aspect.

In the embodiments of the present disclosure, the transparent cover plate covers the first surface of the display panel, the area of the display panel is less than the area of the transparent cover plate, the heat dissipating film layer covers a second surface of the display panel, and at least part of an edge position of the heat dissipating film layer contacts the inner surface of the transparent cover plate. Therefore, the heat dissipating film layer directly contacts the transparent cover plate. Additionally, because the heat dissipating film layer is electrically conductive, the electric charges generated in a copper-rod test may be transferred along the heat dissipating film layer to the transparent cover plate, whereby the electric charges are exported, which prevents green conversion at the edge region of the displaying module caused by the accumulation of the electric charges, to improve the quality of the displaying module and the usage experience of the user.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work.

REFERENCE NUMBERS

10: transparent cover plate; 20: display panel; 30: heat dissipating film layer; 40: circuit board; 50: chip packaging layer; 201: first lateral side; 202: second lateral side; 203: third lateral side; 204: fourth lateral side; 301: insulating layer; 302: electrically conductive layer; 303: circular-arc regions; 304: center region; 305: peripheral region; 501: insulating film layer; 502: electrically conducting film layer;

3011: foam; 3012: adhesive grid layer; 3013: thin polyimide film; 3021: first exposed region; 3022: second exposed region; 3023: third exposed region; 3041: bottom side; 3051: first region; 3052: second region; and 3053: third region.

DETAILED DESCRIPTION

The technical solutions according to the embodiments of the present disclosure will be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be understood that the "one embodiment" or "an embodiment" as used throughout the description means that particular features, structures or characteristics with respect to the embodiments are included in at least one embodiment of the present disclosure. Therefore, the "in one embodiment" or "in an embodiment" as used throughout the description does not necessarily refer to the same embodiment. Furthermore, those particular features, structures or characteristics may be combined in one or more embodiments in any suitable form.

Figure 1:
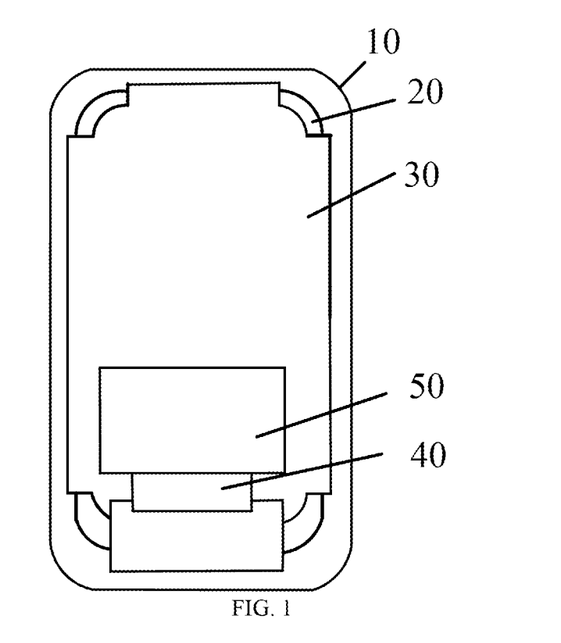
FIG. 1 illustrates a schematic structural diagram of a displaying module according to an embodiment of the present disclosure.

FIG. 1 is a schematic structural diagram of a displaying module according to an embodiment of the present disclosure. As shown in FIG. 1, the displaying module includes a transparent cover plate 10, a display panel 20 and a heat dissipating film layer 30. The transparent cover plate 10 covers a first surface of the display panel 20, and the area of the display panel 20 is less than the area of the transparent cover plate 10, where the first surface refers to the surface of the display panel 20 where a light ray exits. The heat dissipating film layer 30 covers a second surface of the display panel 20, and at least part of an edge position of the heat dissipating film layer 30 contacts the inner surface of the transparent cover plate 10, where the second surface refers to the surface of the display panel 20 that is opposite to the first surface, the inner surface of the transparent cover plate 10 refers to the surface of the transparent cover plate 10 that contacts the display panel 20, and the heat dissipating film layer 30 is electrically conductive.

The transparent cover plate 10 is mainly used to protect the display panel 20, and is used to transmit light rays. The transparent cover plate 10 should have a thermal stability and a chemical stability. If it is required to control the overall weight of the displaying module, the thickness of the transparent cover plate 10 and the density of the transparent cover plate 10 may be properly reduced.

The transparent cover plate 10 covers the first surface of the display panel 20, where the first surface refers to the surface of the display panel 20 where a light ray exits. The area of the display panel 20 is less than the area of the transparent cover plate 10. When both of the display panel 20 and the transparent cover plate 10 are rectangular plates, the longer sides of the display panel 20 are shorter than the longer sides of the transparent cover plate 10, and the shorter sides of the display panel 20 are shorter than the shorter sides of the transparent cover plate 10, whereby the edge position of the transparent cover plate 10 and the display panel 20 do not have an overlapping region therebetween.

The heat dissipating film layer 30 is usually provided on the second surface of the display panel 20. In a copper-rod test, the friction between the copper rods generates electric charges, and the induced electric charges are directed from the lateral sides of the transparent cover plate 10 to the second surface of the display panel 20. In order to enable the electric charges generated by induction in a copper-rod test to be exported out of the transparent cover plate 10, in the embodiments of the present disclosure, the heat dissipating film layer 30 covers a second surface of the display panel 20, and at least part of an edge position of the heat dissipating film layer 30 contacts the inner surface of the transparent cover plate 10. Accordingly, the electric charges generated in the friction between the copper rods can be exported along the heat dissipating film layer 30 and via the grounded Cu, which prevents green conversion at the edge region of the displaying module caused by the accumulation of the electrostatic charges, to improve the quality of the displaying module and the usage experience of the user.

In the embodiments of the present disclosure, the transparent cover plate 10 covers the first surface of the display panel 20, the area of the display panel 20 is less than the area of the transparent cover plate 10, the heat dissipating film layer 30 covers a second surface of the display panel 20, and at least part of an edge position of the heat dissipating film layer 30 contacts the inner surface of the transparent cover plate 10. Therefore, the heat dissipating film layer 30 directly contacts the transparent cover plate 10. Additionally, because the heat dissipating film layer is electrically conductive, the electric charges generated in a copper-rod test can be transferred along the heat dissipating film layer 30 to the transparent cover plate 10, whereby the electric charges are exported, which prevents green conversion at the edge region of the displaying module caused by the accumulation of the electric charges, to improve the quality of the displaying module and the usage experience of the user.

Figure 2:
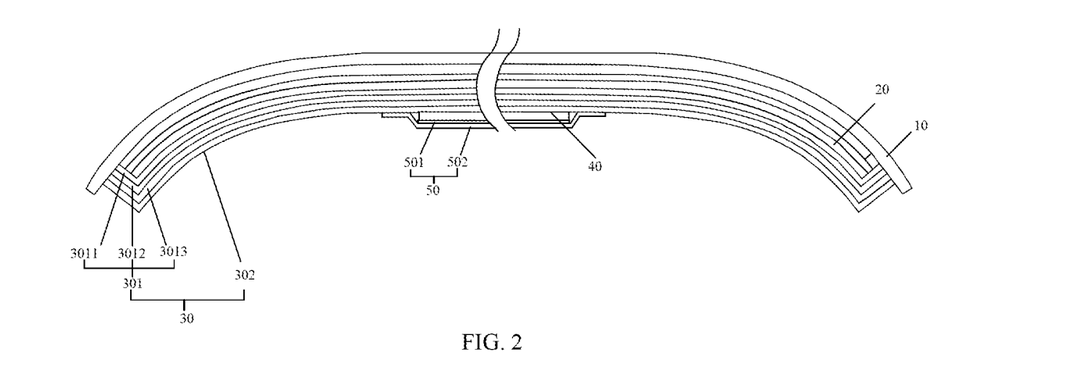
FIG. 2 illustrates a schematic cross-sectional view of a displaying module according to an embodiment of the present disclosure.

Optionally, as shown in FIG. 2, the displaying module further includes a circuit board 40 and a chip packaging layer 50. The circuit board 40 is provided on a surface of the heat dissipating film layer 30. The chip packaging layer 50 includes an insulating film layer 501 and an electrically conducting film layer 502, the insulating film layer 501 covers a surface of the circuit board 40, the electrically conducting film layer 502 covers the insulating film layer 501, and the electrically conducting film layer 502 includes a copper layer.

Particularly, the circuit board 40 is a flexible circuit board 40, and is a printed circuit board having a high reliability and a high pliability that is fabricated by using a polyimide or polyester thin film as the matrix, so as to enable the circuit board 40 to have a high wiring density, a low weight, a low thickness and a good bendability. The chip packaging layer 50 is mainly used to package the circuit board 40, to enable the surface of the circuit board 40 to have an insulating property.

It should be noted that the insulating film layer 501 covers a surface of the circuit board 40, which enables the circuits of the circuit board 40 to be isolated from the external dust and moisture, and can reduce the stress of the circuit board 40 during deflection. Furthermore, the insulating film layer 501 may be a thin film formed by a polyimide and polyester material, so that the insulating film layer 501 has a high flexibility, and has the capacity of tolerating the soldering temperature. The electrically conducting film layer 502 may be an electrically conducting copper layer. Because the electrically conducting copper layer has a low impedance, that facilitates quick exporting of the electric charges, thereby facilitating to ameliorate green conversion at the edge region of the displaying module in a copper-rod test.

Figure 4:
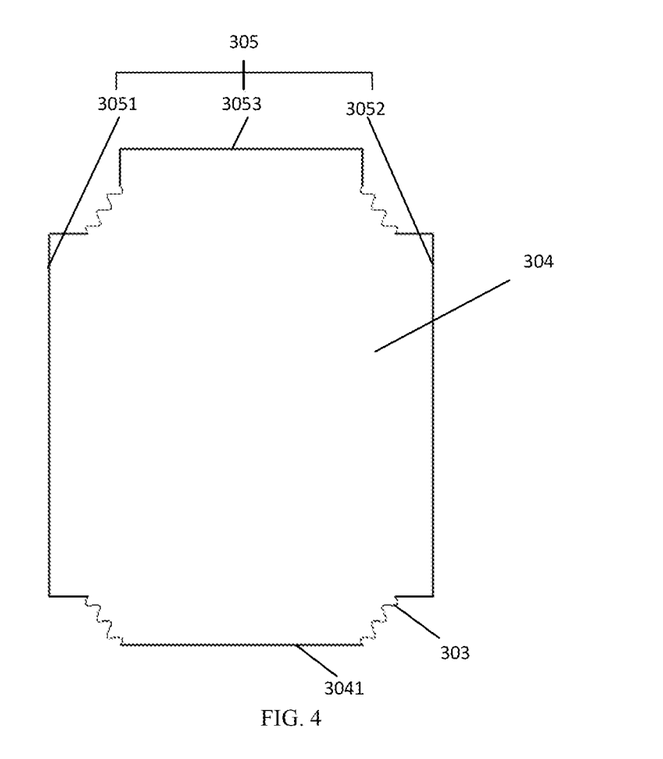
FIG. 4 is a schematic structural diagram of a heat dissipating film layer according to an embodiment of the present disclosure.
Figure 5:
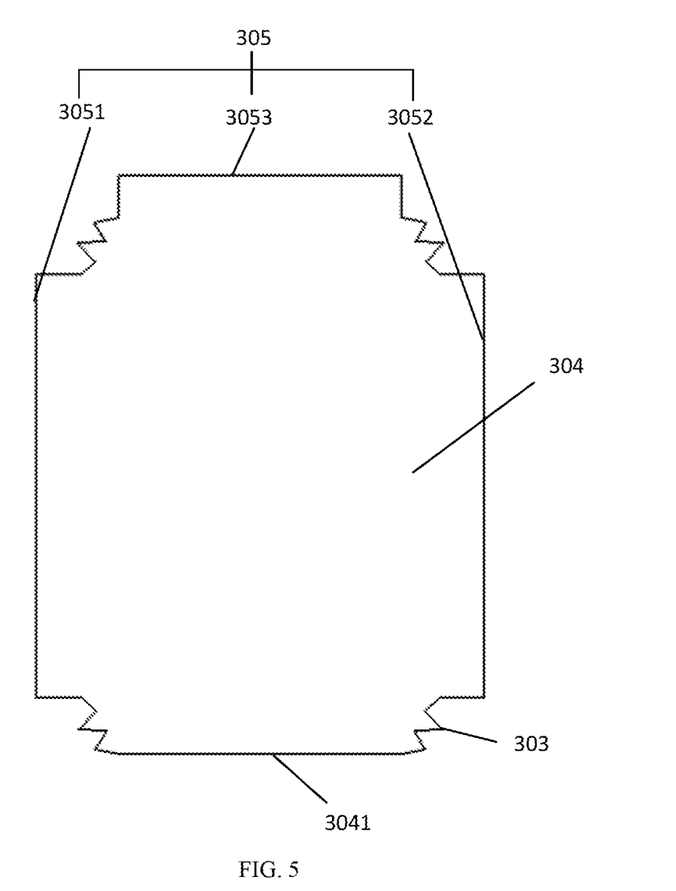
FIG. 5 is a schematic structural diagram of another heat dissipating film layer according to an embodiment of the present disclosure.

Optionally, as shown in FIG. 4 and FIG. 5, the heat dissipating film layer 30 includes a center region 304 and a peripheral region 305. The peripheral region 305 is located at an edge position of the center region 304, and the plane where the peripheral region 305 is located and the plane where the center region 304 is located intersect. The center region 304 covers the second surface of the display panel 20, and the display panel 20 is located in a cavity formed by the center region 304, the peripheral region 305 and the transparent cover plate 10.

It should be noted that the plane where the center region 304 is located and the plane where the display panel 20 is located are parallel, so that the center region 304 and the display panel 20 are stacked, whereby the center region 304 adheres to the second surface of the display panel 20, and accordingly the center region 304 can be used to perform heat dissipation to the components such as the display panel 20 and the circuit board 40. The plane where the peripheral region 305 is located and the plane where the center region 304 is located intersect; in other words, the plane where the peripheral region 305 is located and the surface where the display panel 20 is located intersect, whereby the ends of the peripheral region 305 can contact the transparent cover plate 10, thereby transferring the electric charges generated in a copper-rod test via the peripheral region 305. Furthermore, the peripheral region 305 surrounds the peripheral side of the display panel 20, whereby the display panel 20 can be located in the cavity formed by the peripheral region 305, the center region 304 and the transparent cover plate 10. The peripheral region 305 may be formed by bending the center region 304, and may also be formed by independent heat conducting fins fixedly connected to the lateral sides of the center region 304, which is not limited in the embodiments of the present disclosure.

Figure 6:
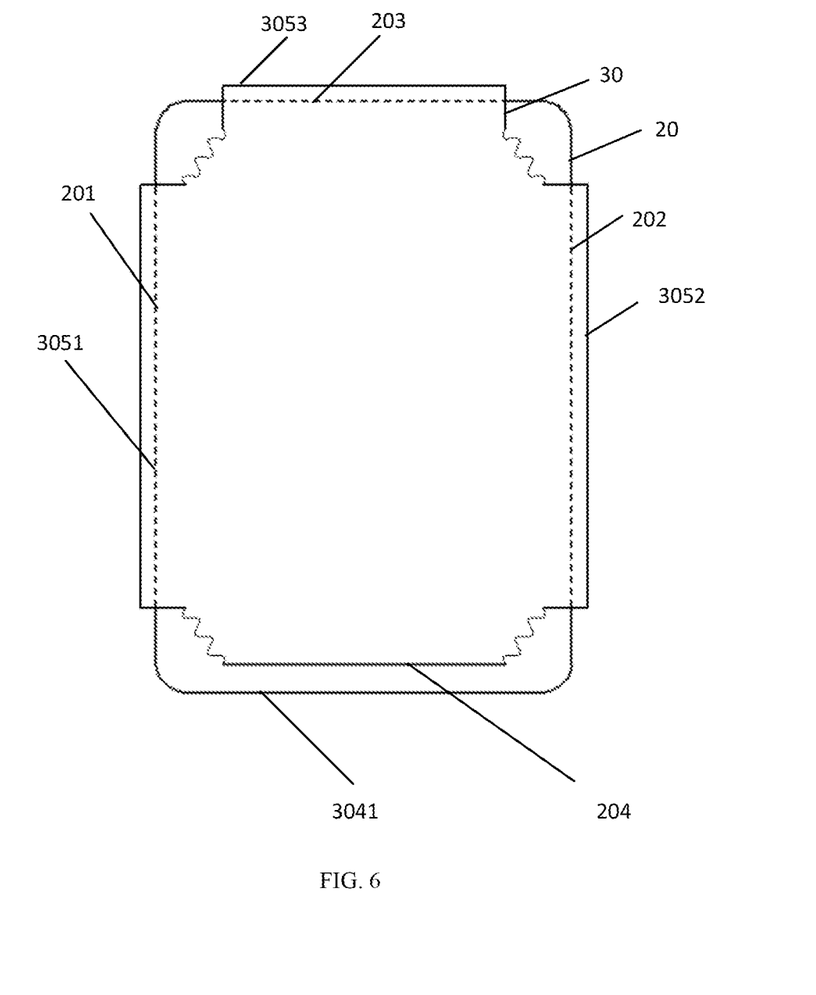
FIG. 6 is a schematic diagram of the assembling of a heat dissipating film layer and a display panel according to an embodiment of the present disclosure.

Optionally, as shown in FIG. 4, FIG. 5 and FIG. 6, the peripheral region 305 includes a first region 3051, a second region 3052 and a third region 3053. The display panel 20 includes a first lateral side 201, a second lateral side 202 and a third lateral side 203, the first region 3051 is located on the outer side of the first lateral side 201 and is bent toward the transparent cover plate 10, the second region 3052 is located on the outer side of the second lateral side 202 and is bent toward the transparent cover plate 10, and the third region 3053 is located on the outer side of the third lateral side 203 and is bent toward the transparent cover plate 10, where the first lateral side 201 and the second lateral side 202 refer to the two parallel longer sides of the display panel 20, and the third lateral side 203 and the first lateral side 201 are perpendicular.

Particularly, if the center region 304 is a rectangular heat dissipating fin, three lateral sides of the center region 304 may be bent toward the transparent cover plate 10 to form the first region 3051, the second region 3052 and the third region 3053. The first region 3051 is located on the outer side of the first lateral side 201, the second region 3052 is located on the outer side of the second lateral side 202, and the third region 3053 is located on the outer side of the third lateral side 203, where the outer side refers to the side of the display panel away from the center region. Therefore, the first region 3051 and the second region 3052 are parallel, and the third region 3053 is located between the first region 3051 and the second region 3052. Accordingly, via the first region 3051, the second region 3052 and the third region 3053, the electric charges generated in a copper-rod test can be conducted to the transparent cover plate 10, whereby the paths of the charge transfer are evenly distributed on the peripheral side of the display panel 20, which facilitates the transferring of the heat and the electric charges. It should be noted that the plane where the first region 3051 is located and the plane where the second region 3052 is located may be continuous rectangular planes, and may also be discontinuous rectangular planes, which is not limited in the embodiments of the present disclosure.

Figure 3:
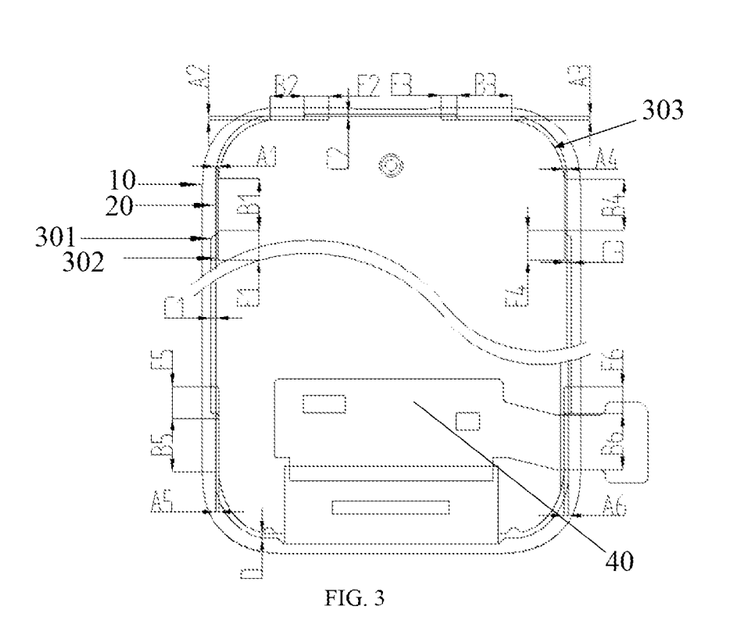
FIG. 3 illustrates a schematic diagram of the size of a displaying module according to an embodiment of the present disclosure.

Optionally, as shown in FIG. 3, the center region 304 further includes circular-arc regions 303, the circular-arc regions 303 are located at the four corners of the center region 304, the projections of the circular-arc regions 303 on the display panel 20 in a first direction are of a circular-arc shape, and spacings are provided between the projection of each of the circular-arc regions and the edges of the neighboring corner of the display panel 20, where the first direction refers to the direction perpendicular to the display panel 20.

It should be noted that, because the projection of each of the circular-arc regions 303 and the edges of the neighboring corner of the display panel 20 have spacings therebetween, the four corners of the center region 304 have notches; in other words, the heat dissipating film layer 30 does not contact the transparent cover plate at the positions where the circular-arc regions 303 are located. Therefore, the detecting personnel can observe the internal installation position of the display panel 20 via the positions where the four circular-arc regions 303 of the heat dissipating film layer 30 are located. Accordingly, the degree of the adhesion between the heat dissipating film layer 30 and the display panel 20 can be determined by using the four circular-arc regions 303 included by the center region 304, which facilitates to detect the installation accuracy between the heat dissipating film layer 30 and the display panel 20.

Furthermore, it should also be noted that the projections of the circular-arc regions 303 on the display panel 20 in the first direction may be of a circular-arc shape shown in FIG. 1, may also be of a sawtooth shape shown in FIG. 5, and may also be of a wave shape shown in FIG. 4, which is not limited in the embodiments of the present disclosure.

Optionally, as shown in FIG. 3, both of the spacings between the projection of each of the circular-arc regions 303 and the edges of the neighboring corner of the display panel 20 are a first numerical value, where the first numerical value is greater than or equal to 0.1 mm, and less than or equal to 1 mm.

Particularly, because both of the spacings between the projection of each of the circular-arc regions 303 and the edges of the neighboring corner of the display panel 20 are 0.1 mm to 1 mm, preferably 0.45 mm, while the heat dissipating film layer 30 is protecting the display panel 20, the heat dissipating film layer 30 can adhere to the display panel 20 better. The first numerical value is as shown by A1, A2, A3, A4, A5 and A6 in FIG. 3.

Optionally, as shown in FIG. 3, two ends of the first region 3051 and the neighboring circular-arc region 303 have an extension part therebetween, two ends of the second region 3052 and the neighboring circular-arc region 303 have an extension part therebetween, and two ends of the third region 3053 and the neighboring circular-arc region 303 have an extension part therebetween. The projections of the extension parts in the first direction are on the display panel.

It should be noted that, because the projections of the extension parts in the first direction are on the display panel, the positions where the extension parts are located do not contact the transparent cover plate 10. Therefore, the detecting personnel can observe the internal installation position of the display panel 20 via the positions where the four circular-arc regions 303 of the heat dissipating film layer are located, thereby expanding the area that the detecting personnel can observe, to further optimize the detection on the installation accuracy between the heat dissipating film layer 30 and the display panel 20.

Optionally, by providing the extension parts at the four corners of the center region 304 in the above-described manner, the display panel 20 further has exposed parts besides the four corners, and, accordingly, by that two ends of the first region 3051 and the neighboring circular-arc region 303 have an extension part therebetween, two ends of the second region 3052 and the neighboring circular-arc region 303 have an extension part therebetween, and two ends of the third region 3053 and the neighboring circular-arc region 303 have an extension part therebetween, it can be determined whether the display panel 20 and the heat dissipating film layer 30 completely adhere. Particularly, the working personnel, in the checking, may directly detect whether the heat dissipating film layer 30 completely adheres to the display panel 20 at the four corners. If the heat dissipating film layer 30 completely adheres to the display panel 20 at the four corners, then it can be determined that the heat dissipating film layer 30 entirely completely adheres to the display panel 20. If the heat dissipating film layer 30 protrudes out of the edge position of the display panel 20 at the four corners, then it can be determined that the heat dissipating film layer 30 entirely does not adhere to the display panel 20.

Furthermore, in some embodiments, the length of the extension part between the two ends of the first region 3051 and the neighboring circular-arc region 303 is a first length, the length of the extension part between the two ends of the second region 3052 and the neighboring circular-arc region 303 is a second length, and the length of the extension part between the two ends of the third region 3053 and the neighboring circular-arc region 303 is a third length. All of the first length, the second length and the third length are greater than 0, and less than or equal to 10 mm, where the first length and the second length refer to the lengths of the projections of the extension parts on the display panel in the first direction that are parallel to the first lateral side 201 of the display panel, and the third length refers to the length of a projection of the extension part on the display panel in the first direction that is parallel to the third lateral side 203 of the display panel.

It should be noted that the first length is as shown by B1 and B5 in FIG. 3, the second length is as shown by B4 and B6 in FIG. 3, and the third length is as shown by B2 and B3 in FIG. 3. Accordingly, as all of the first length, the second length and the third length are greater than 0, and less than or equal to 10 mm, that does not affect the charge transfer within the first region 3051, the second region 3052 and the third region 3053 while ensuring the area that the working personnel can observe.

Optionally, as shown in FIG. 3, the spacing between a projection of the first region 3051 on the display panel and the first lateral side 201 of the display panel 20 is a second numerical value, the spacing between a projection of the second region 3052 on the display panel 20 and the second lateral side 202 of the display panel 20 is a third numerical value, and the spacing between a projection of the third region 3053 on the display panel 20 and the third lateral side 203 of the display panel 20 is a fourth numerical value, where all of the second numerical value, the third numerical value and the fourth numerical value are greater than or equal to 0.1 mm, and less than or equal to 5 mm.

It should be noted that the spacing between a projection of the first region 3051 on the display panel and the first lateral side 201 of the display panel 20, the spacing between a projection of the second region 3052 on the display panel and the second lateral side 202 of the display panel 20, and the spacing between a projection of the third region 3053 on the display panel 20 and the third lateral side 203 of the display panel 20 are controlled within the numerical-value range greater than or equal to 0.1 mm and less than or equal to 5 mm, which can, while maintaining the spacings between the first region 3051, the second region 3052 and the third region 3053 and the lateral sides of the display panel 20 within the preset numerical-value range, ensure that the positions of the contacting between the first region 3051, the second region 3052 and the third region 3053 and the transparent cover plate 10 are located between the edges of the transparent cover plate 10 and the lateral sides of the display panel 20, and facilitates the adhesion between the heat dissipating film layer 30 and the display panel 20. The second numerical value is as shown by C1 in FIG. 3, the third numerical value is as shown by C3 in FIG. 3, and the fourth numerical value is as shown by C2 in FIG. 4.

Optionally, as shown in FIGS. 3 and 6, the displaying module further includes a circuit board 40 and a chip packaging layer 50, the center region 304 further includes a bottom side 3041, and the display panel 20 further includes a fourth lateral side 204. The fourth lateral side 204 refers to the side of the display panel 20 that is close to the circuit board 40 or the chip packaging layer 50, the bottom side 3041 refers to the side of the center region that is close to the circuit board 40 or the chip packaging layer 50, and a projection of the bottom side 3041 on the display panel 20 is located on the side of the fourth lateral side 204 away from the chip packaging layer.

Particularly, as the fourth lateral side 204 refers to the side of the display panel 20 that is close to the circuit board 40 or the chip packaging layer 50, and the bottom side 3041 refers to the side of the center region that is close to the circuit board 40 or the chip packaging layer 50, the bottom side 3041 of the center region 304 retracts in the direction further away from the edge of the transparent cover plate, which enables the provision of the heat dissipating film layer 30 not to affect the provision of the circuit board 40 and the chip packaging layer 50, facilitates the bending of the first region 3051, the second region 3052 and the third region 3053, and reduces the cost on fabricating the heat dissipating film layer 30.

Furthermore, the spacing between the projection of the bottom side 3041 on the display panel 20 and the fourth lateral side 204 is a fifth numerical value, where the fifth numerical value is greater than or equal to 0.1 mm, and less than or equal to 1 mm. Accordingly, that, while ensuring leaving the room for the provision of the circuit board 40 and the chip packaging layer 50, ensures the heat dissipating area of the center region 304 to the largest extent. The fifth numerical value is as shown by D in FIG. 3.

Figure 7:
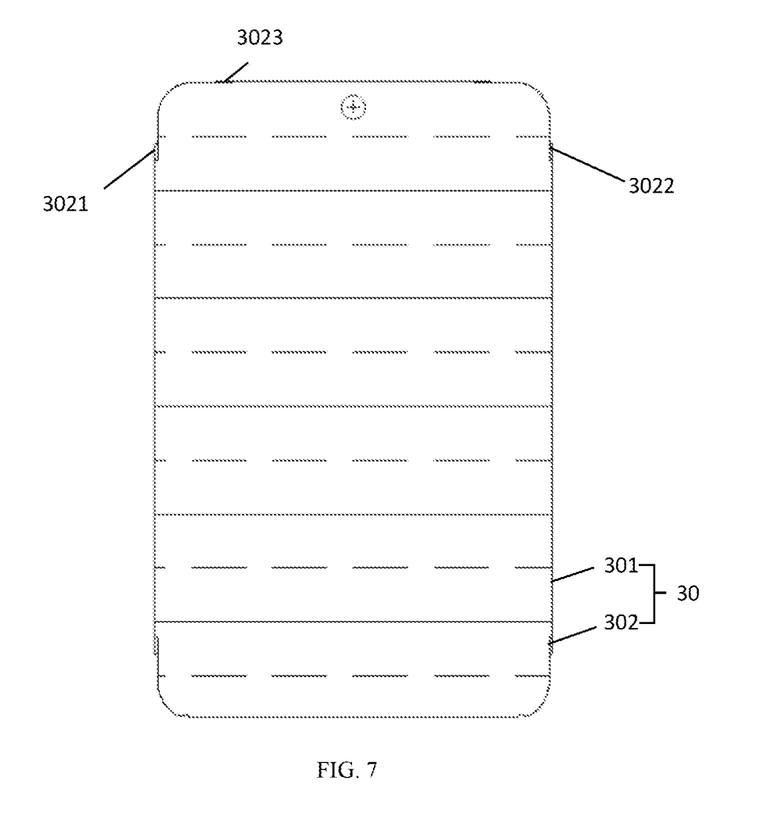
FIG. 7 is a schematic diagram of the assembling of an insulating layer and an electrically conductive layer included by a heat dissipating film layer according to an embodiment of the present disclosure.

Optionally, as shown in FIG. 3 and FIG. 7, the heat dissipating film layer 30 includes an insulating layer 301 and an electrically conductive layer 302. The insulating layer 301 adheres to the second surface of the display panel 20, and the electrically conductive layer 302 covers the insulating layer 301. In the first region 3051, the second region 3052 and the third region 3053, the electrically conductive layer 302 exposes part of the insulating layer 302.

Particularly, the insulating layer 301 may include a foam 3011, an adhesive grid layer 3012 and a thin polyimide film 3013. The foam 3011 covers the second surface of the display panel 20. The adhesive grid layer 3012 is provided between the thin polyimide film 3013 and the foam 3011.

The foam 3011 may be a low-density foam layer, and has many pores, which does not only facilitate quick heat dissipation, but also can provide certain cushion to the display panel 20, thereby facilitating to reduce the damage on the displaying surface by the provision of the heat dissipating film layer 30. The electrically conductive layer 302 may be an electrically conducting copper layer, and the electrically conducting copper layer covers the thin polyimide film 3013. Accordingly, while ensuring the close adhesion between the layers, the electric charges can be transferred by the electrically conductive layer 302. Furthermore, because in the first region 3051, the second region 3052 and the third region 3053, the electrically conductive layer 302 exposes part of the insulating layer 301, the electrically conductive layer 302 retracts relatively to the insulating layer 301 in the direction further away from the edge of the display panel 20, thereby preventing affection by the provision of the electrically conductive layer 302 on the signal transmission within the displaying module.

Optionally, as shown in FIG. 7, in the first region 3051 the insulating layer 302 has at least one first exposed region 3021, in the second region 3052 the insulating layer 302 has at least one second exposed region 3022, and in the third region 3053 the insulating layer 303 has at least one third exposed region 3023. In the direction parallel to the first lateral side 201, the length of the first exposed region 3021 is less than or equal to one third of the length of the first lateral side 201, and in the direction parallel to the third lateral side 203, the length of the first exposed region 3021 is less than or equal to the length of the first region 3051. In the direction parallel to the second lateral side 202, the length of the second exposed region 3022 is less than or equal to one third of the length of the second lateral side 302, and in the direction parallel to the third lateral side 203, the length of the first exposed region 3021 is less than or equal to the length of the second region 3052. In the direction parallel to the third lateral side 203, the length of the third exposed region 3023 is less than or equal to one third of the length of the third lateral side 203, and in the direction parallel to the first lateral side 201, the length of the third exposed region 3023 is less than or equal to the length of the third region 3052.

Particularly, the length of the first exposed region 3021 is as shown by E1 in FIG. 3, the length of the second exposed region 3022 is as shown by E4 in FIG. 3, and the length of the third exposed region 3023 is as shown by E2 and E3 in FIG. 3. The length of the first exposed region 3021 may be equal to the length of the second exposed region 3022, and particularly the length of the first exposed region 3021 and the length of the second exposed region 3022 may be between 8 mm and 10 mm, thereby ensuring that the provision of the electrically conductive layer 302 does not affect the signal transmission of the displaying module. The length of the first exposed region 3021, the length of the second exposed region 3022 and the length of the third exposed region 3023 are determined according to the design of the signal transmitting device, and are not limited in the embodiments of the present disclosure.

It can be seen from the above embodiments that, in the embodiments of the present disclosure, the transparent cover plate 10 covers the first surface of the display panel 20, the area of the display panel 20 is less than the area of the transparent cover plate 10, the heat dissipating film layer 30 covers a second surface of the display panel 20, and at least part of an edge position of the heat dissipating film layer 30 contacts the inner surface of the transparent cover plate 10. Therefore, the heat dissipating film layer 30 directly contacts the transparent cover plate 10. Additionally, because the heat dissipating film layer is electrically conductive, the electric charges generated in a copper-rod test can be transferred along the heat dissipating film layer 30 to the transparent cover plate 10, whereby the electric charges are exported, which prevents green conversion at the edge region of the displaying module caused by the accumulation of the electric charges, to improve the quality of the displaying module and the usage experience of the user.

The present disclosure further provides a displaying device, where the displaying device includes the displaying module according to any one of the embodiments stated above. The advantageous effects of the displaying device are the same as the advantageous effects of the displaying module stated above, and are not discussed further in the embodiments of the present disclosure.

It should be noted that the embodiments of the description are described in the mode of progression, each of the embodiments emphatically describes the differences from the other embodiments, and the same or similar parts of the embodiments may refer to each other.

Although alternative embodiments of the embodiments of the present disclosure have been described, once a person skilled in the art has known the essential inventive concept, he may make further variations and modifications on those embodiments. Therefore, the appended claims are intended to be interpreted as including the alternative embodiments and all of the variations and modifications that fall within the scope of the embodiments of the present disclosure.

Finally, it should also be noted that, herein, relation terms such as first and second are merely intended to distinguish one entity from another entity, and that does not necessarily require or imply that those entities have therebetween any such actual relation or order. Furthermore, the terms "include", "comprise" or any variants thereof are intended to cover non-exclusive inclusions, so that articles or terminal devices that include a series of elements do not only include those elements, but also include other elements that are not explicitly listed, or include the elements that are inherent to such articles or terminal devices. Unless further limitation is set forth, an element defined by the wording "comprising a . . . " does not exclude additional same element in the article or terminal device comprising the element.

The technical solutions of the present disclosure have been described in detail above. The principle and the embodiments of the present disclosure are described herein with reference to the particular examples. Moreover, for a person skilled in the art, according to the principle and the implementations of the present disclosure, the particular embodiments and the range of application may be varied. In conclusion, the contents of the description should not be understood as limiting the present disclosure.

The invention claimed is:

1. A displaying module comprising a transparent cover plate, a display panel, a heat dissipating film layer, a circuit board, and a chip packaging layer, wherein:
the transparent cover plate covers a first surface of the display panel, and an area of the display panel is less than an area of the transparent cover plate, wherein the first surface refers to a surface of the display panel where a light ray exits;
the heat dissipating film layer covers a second surface of the display panel, and at least part of an edge position of the heat dissipating film layer contacts an inner surface of the transparent cover plate, wherein the second surface refers to a surface of the display panel that is opposite to the first surface, the inner surface of the transparent cover plate refers to a surface of the transparent cover plate that contacts the display panel, and the heat dissipating film layer is electrically conductive;

the circuit board is provided on a surface of the heat dissipating film layer; and the chip packaging layer comprises an insulating film layer and an electrically conducting film layer, the insulating film layer covers a surface of the circuit board, the electrically conducting film layer covers the insulating film layer, and the electrically conducting film layer comprises a copper layer.

2. A displaying device, wherein the displaying device comprises the displaying module according to claim 1.

3. The displaying module according to claim 1, wherein when the display panel and the transparent cover plate are rectangular plates, longer sides of the display panel are shorter than longer sides of the transparent cover plate, and shorter sides of the display panel are shorter than shorter sides of the transparent cover plate.

4. A displaying module comprising a transparent cover plate, a display panel, and a heat dissipating film layer, wherein:

the transparent cover plate covers a first surface of the display panel, and an area of the display panel is less than an area of the transparent cover plate, wherein the first surface refers to a surface of the display panel where a light ray exits;

the heat dissipating film layer covers a second surface of the display panel, and at least part of an edge position of the heat dissipating film layer contacts an inner surface of the transparent cover plate, wherein the second surface refers to a surface of the display panel that is opposite to the first surface, the inner surface of the transparent cover plate refers to a surface of the transparent cover plate that contacts the display panel, and the heat dissipating film layer is electrically conductive;

the heat dissipating film layer comprises a center region and a peripheral region;

the peripheral region is located at an edge position of the center region, and a plane where the peripheral region is located and a plane where the center region is located intersect; and the center region covers the second surface of the display panel, and the display panel is located in a cavity formed by the center region, the peripheral region and the transparent cover plate.

5. The displaying module according to claim 4, wherein the peripheral region comprises a first region, a second region and a third region; and the display panel comprises a first lateral side, a second lateral side and a third lateral side, the first region is located on an outer side of the first lateral side and is bent toward the transparent cover plate, the second region is located on an outer side of the second lateral side and is bent toward the transparent cover plate, and the third region is located on an outer side of the third lateral side and is bent toward the transparent cover plate, wherein the first lateral side and the second lateral side refer to two parallel longer sides of the display panel, and the third lateral side and the first lateral side are perpendicular.

6. The displaying module according to claim 5, wherein the center region further comprises circular-arc regions; and the circular-arc regions are located at four corners of the center region, projections of the circular-arc regions on the display panel in a first direction are of a circular-arc shape, and spacings are provided between a projection of each of the circular-arc regions and edges of a neighboring corner of the display panel, wherein the first direction refers to a direction perpendicular to the display panel.

7. The displaying module according to claim 6, wherein both of the spacings between the projection of each of the circular-arc regions and the edges of the neighboring corner of the display panel are a first numerical value, wherein the first numerical value is greater than or equal to 0.1 mm, and less than or equal to 1 mm.

8. The displaying module according to claim 7, wherein the first numerical value is 0.45 mm.

9. The displaying module according to claim 6, wherein extension parts are provided between two ends of the first region and neighboring circular-arc regions, two ends of the second region and neighboring circular-arc regions, and two ends of the third region and neighboring circular-arc regions; and projections of the extension parts in the first direction are on the display panel.

10. The displaying module according to claim 9, wherein a length of the extension part between the two ends of the first region and the neighboring circular-arc regions is a first length, a length of the extension part between the two ends of the second region and the neighboring circular-arc regions is a second length, and a length of the extension part between the two ends of the third region and the neighboring circular-arc regions is a third length; and all of the first length, the second length and the third length are greater than 0, and less than or equal to 10 mm, wherein the first length and the second length refer to lengths of projections of the extension parts on the display panel in the first direction that are parallel to the first lateral side of the display panel, and the third length refers to a length of a projection of the extension part on the display panel in the first direction that is parallel to the third lateral side of the display panel.

11. The displaying module according to claim 5, wherein a spacing between a projection of the first region on the display panel and the first lateral side of the display panel is a second numerical value, a spacing between a projection of the second region on the display panel and the second lateral side of the display panel is a third numerical value, and a spacing between a projection of the third region on the display panel and the third lateral side of the display panel is a fourth numerical value, wherein the second numerical value, the third numerical value and the fourth numerical value are greater than or equal to 0.1 mm, and less than or equal to 5 mm.

12. The displaying module according to claim 5, wherein the displaying module further comprises a circuit board and a chip packaging layer, the center region further comprises a bottom side, and the display panel further comprises a fourth lateral side; and the fourth lateral side refers to one side of the display panel that is close to the circuit board or the chip packaging layer, the bottom side refers to one side of the center region that is close to the circuit board or the chip packaging layer, and a projection of the bottom side on the display panel is located on one side of the fourth lateral side away from the chip packaging layer.

13. The displaying module according to claim 12, wherein a spacing between the projection of the bottom side on the display panel and the fourth lateral side is a fifth numerical value, wherein the fifth numerical value is greater than or equal to 0.1 mm, and less than or equal to 1 mm.

14. The displaying module according to claim 12, wherein the heat dissipating film layer comprises an insulating layer and an electrically conductive layer;
the insulating layer adheres to the second surface of the display panel, and the electrically conductive layer covers the insulating layer; and
in the first region, the second region and the third region, the electrically conductive layer exposes part of the insulating layer.

15. The displaying module according to claim 14, wherein in the first region the insulating layer has at least one first exposed region, in the second region the insulating layer has at least one second exposed region, and in the third region the insulating layer has at least one third exposed region;
in a direction parallel to the first lateral side, a length of the first exposed region is less than or equal to one third of a length of the first lateral side, and in a direction parallel to the third lateral side, the length of the first exposed region is less than or equal to a length of the first region;
in a direction parallel to the second lateral side, a length of the second exposed region is less than or equal to one third of a length of the second lateral side, and in the direction parallel to the third lateral side, the length of the first exposed region is less than or equal to a length of the second region; and
in the direction parallel to the third lateral side, a length of the third exposed region is less than or equal to one third of a length of the third lateral side, and in the direction parallel to the first lateral side, the length of the third exposed region is less than or equal to a length of the third region.

16. The displaying module according to claim 15, wherein the length of the first exposed region and the length of the second exposed region are between 8 mm and 10 mm.

17. The displaying module according to claim 14, wherein the insulating layer comprises a foam, an adhesive grid layer and a thin polyimide film, the foam covers the second surface of the display panel, the adhesive grid layer is provided between the thin polyimide film and the foam.

18. The displaying module according to claim 17, wherein the foam is a low-density foam layer and has many pores.

19. The displaying module according to claim 17, wherein the electrically conductive layer is an electrically conducting copper layer, and the electrically conducting copper layer covers the thin polyimide film.

\* \* \* \* \*